US008330794B2

(12) United States Patent
Ramanathan et al.

(10) Patent No.: US 8,330,794 B2
(45) Date of Patent: Dec. 11, 2012

(54) IMPLEMENTING MULTIPLE DOMINANT SPEAKER VIDEO STREAMS WITH MANUAL OVERRIDE

(75) Inventors: Rajesh Ramanathan, Redmond, WA (US); Ankit Tandon, Bellevue, WA (US); Tim Moore, Bellevue, WA (US); Avronil Bhattacharjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 12/482,442

(22) Filed: Jun. 10, 2009

(65) Prior Publication Data
US 2010/0315484 A1 Dec. 16, 2010

(51) Int. Cl.
H04N 7/15 (2006.01)
H04J 3/06 (2006.01)
G06F 15/16 (2006.01)

(52) U.S. Cl. ............... 348/14.09; 348/14.03; 348/14.07; 348/14.08; 348/14.12; 370/473; 370/503; 379/90.01; 709/204; 709/231

(58) Field of Classification Search ............... 348/14.03, 348/14.07, 14.08, 14.12, 14.09; 370/473; 370/503; 379/90.01; 709/231, 204
See application file for complete search history.

(56) References Cited

U.S. PATENT DOCUMENTS

| | | | | |
|---|---|---|---|---|
| 5,745,380 A * | 4/1998 | Sandvoss et al. | ......... | 379/90.01 |
| 6,989,856 B2 * | 1/2006 | Firestone et al. | ......... | 348/14.09 |
| 7,007,098 B1 | 2/2006 | Smyth et al. | | |
| 7,313,593 B1 * | 12/2007 | Pulito et al. | .................. | 709/204 |
| 7,475,112 B2 | 1/2009 | Sinclair et al. | | |
| 7,693,190 B2 * | 4/2010 | Firestone et al. | ............. | 370/503 |
| 7,797,383 B2 * | 9/2010 | Baird | ........................... | 709/204 |
| 8,130,256 B2 * | 3/2012 | Trachtenberg et al. | .... | 348/14.08 |
| 2006/0055771 A1 * | 3/2006 | Kies | ......................... | 348/14.03 |
| 2008/0068446 A1 * | 3/2008 | Barkley et al. | ............. | 348/14.07 |
| 2008/0100694 A1 * | 5/2008 | Barkley et al. | ............. | 348/14.08 |
| 2008/0101410 A1 * | 5/2008 | Barkley et al. | ................ | 370/473 |
| 2008/0267282 A1 | 10/2008 | Kalipatnapu et al. | | |
| 2008/0316296 A1 | 12/2008 | King et al. | | |
| 2009/0182889 A1 * | 7/2009 | Hurst et al. | .................. | 709/231 |
| 2010/0315484 A1 * | 12/2010 | Ramanathan et al. | ..... | 348/14.09 |
| 2012/0026277 A1 * | 2/2012 | Malzbender et al. | ...... | 348/14.07 |

OTHER PUBLICATIONS

"Microsoft Office Communicator 2007: Beta 3 Evaluation Guide", Retrieved at<<http://download.microsoft.com/download/f/f/4/ff42a24e-a2d6-40f4-bc46-01c2f6fd924e/247_138.doc>>, pp. 87.
"IP Video Telephony", Retrieved at<<http://www.cisco.com/en/US/docs/voice_ip_comm/cucm/srnd/6x/video.html>>, Retrieved Date: Mar. 24, 2009, pp. 23.
"Video Conferencing Services", Retrieved at<<http://www.radisys.com/files/solutions/RadiSys-Convedia-VideoConferencing.pdf>>, Retrieved Date: Mar. 24, 2009, pp. 4.

(Continued)

*Primary Examiner* — Gerald Gauthier
(74) *Attorney, Agent, or Firm* — Turk IP Law, LLC

(57) ABSTRACT

In a video conference system capable of providing multiple video streams, displayed streams for participants are configured based on automatic selection by the system (such as active speaker) and manual override by the participants. The displayed views are further enhanced by implementing duplicate detection to avoid display of duplicate streams between the automatic selections and manual selections.

20 Claims, 12 Drawing Sheets

OTHER PUBLICATIONS

Zhang, et al."Research on User Applying Mode for Video Conference System", Retrieved at<<http://ieeexplore.ieee.org/stamp/stamp.jsp?arnumber=04287566>>, Eighth ACIS International Conference on Software Engineering, Artificial Intelligence, Networking, and Parallel/Distributed Computing, Jul. 30, 2007, pp. 6.

"Cisco Unified Videoconferencing 3515 MCU 5.6", Retrieved at<<http://www.cisco.com/en/US/prod/collateral/video/ps7190/ps1870/ps6960/product_data_sheet0900aecd804bbfb0.html>>, Retrieved Date: Mar. 24, 2009, pp. 9.

"MGC WebCommander", Retrieved at<<http://helpnet.vccs.edu/EServices/Video/MGC_WebCommander_User's_Guide_V31.pdf>>, Version 3.0, Retrieved Date: Mar. 24, 2009, pp. 179.

* cited by examiner

IMPLEMENTING MULTIPLE DOMINANT SPEAKER VIDEO STREAMS WITH MANUAL OVERRIDE

BACKGROUND

Videoconferencing uses telecommunications of audio and video to bring people at different sites together for a meeting. This can be as simple as a conversation between two people in private offices (point-to-point) or involve several sites (multipoint) with more than one person in a number of rooms at different sites. Besides the audio and visual transmission of people, videoconferencing can be used to share documents, computer-displayed information, and whiteboards.

Videoconferencing among multiple remote points is sometimes facilitated employing Multipoint Control Unit (MCU) for routing Audio and Video streams, sometimes also called an Audio/Video MCU (AVMCU). An MCU is a bridge that interconnects calls from several sources. All parties call the MCU, or the MCU may call the parties which are going to participate, for initiating the conference. MCUs may use various protocols such as Internet Protocol (IP), and be structured as software program(s), hardware, or combination of the two. One of the main tasks for an MCU is to organize the conference based on capabilities of the participating parties (e.g. receiving parties and source in a single source directed conference).

Some video conferencing services provide multiple video streams to the users. Some services also provide the ability to select specific users to view in a conference. However, users lack the ability to dynamically manage the number of speakers in the conference so they are able to optimize their viewing screen to automatically view only the last n people currently speaking or participating, and also select to watch specific participants along with the dynamic speakers.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatically selecting video streams for a video conference participant, enabling the participant to manually override selections, and enhancing locally viewed video stream by using duplicate detection as described herein.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, available video streams may be automatically selected for a video conference participant, the participant may be enabled to manually override selections, and locally viewed video stream enhanced based on duplicate detection. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
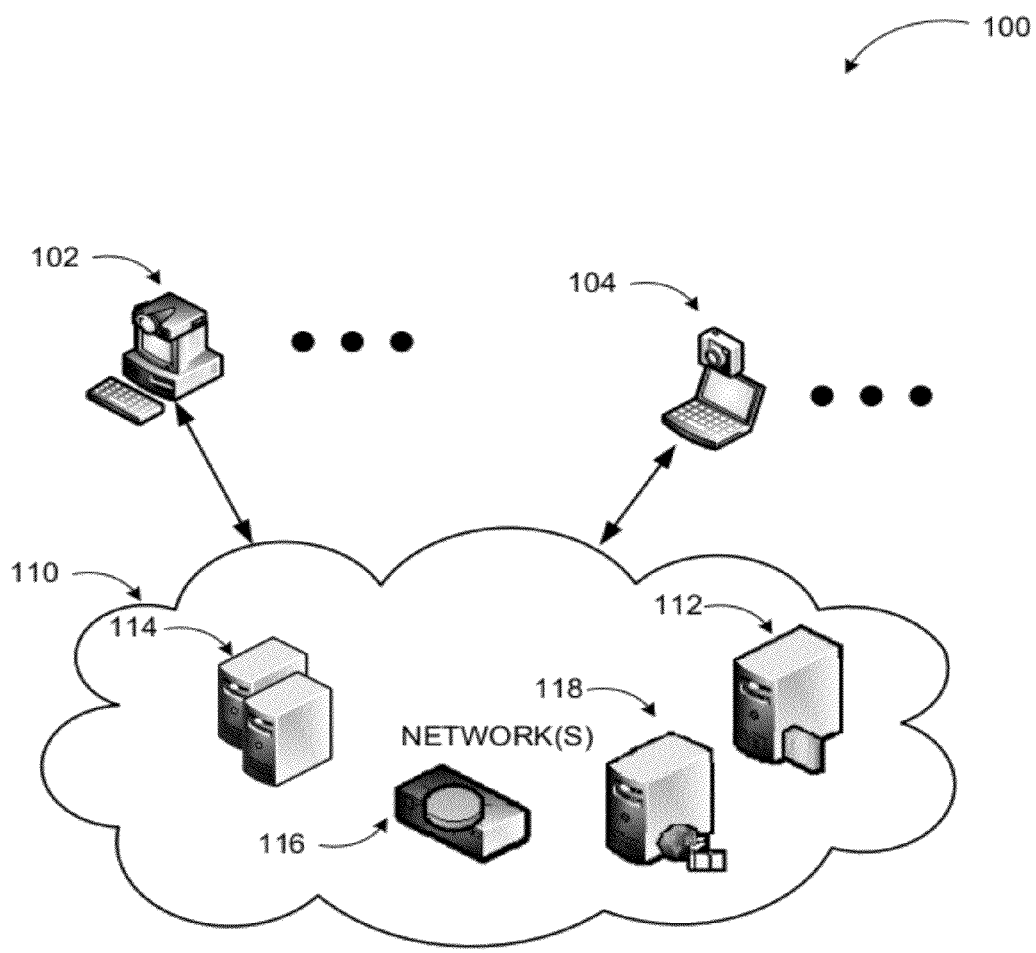
FIG. 1 is a diagram illustrating an example video conferencing system.

Referring to FIG. 1, diagram 100 of an example video conferencing system is illustrated. At the core of a video conferencing system is a network (e.g. network(s) 110) enabling a number of participants with audio/video transmission and reception capability to communicate with each other as a group. Participant devices 102, 104 may be any computing device with audio/video capability such as desktop or laptop computers with a camera and microphone (as well as a speaker), specialized video conferencing equipment, or even mobile devices with audio/video capabilities.

Network 110, as discussed in more detail below, may be any communication network or combination of networks. The video conference may be facilitated by a single device/program or by a combination of devices and programs. For example, audio/video server 118, firewall server 112, or mediation servers 114 may be involved with different aspects of the conference such as storage and processing of audio/video files, security, or interconnection of various networks for seamless communication. Any of these example tasks and others may be performed by software programs, hardware devices, and/or combination of the two.

According to one embodiment, MCU 116 may be the main facilitator of the video conference in coordination with one or more of the other devices and/or programs mentioned. MCU 116 may use various protocols such as Internet Protocol (IP), and be structured as software program(s), hardware, or combination of the two. MCU 116 may be a stand-alone hardware device, or it may be embedded into dedicated conferencing devices (e.g. audio/video server 118 or mediation servers 114). Furthermore, MCU 116 may be structured as a "decentralized multipoint", where each station in a multipoint call exchanges video and audio directly with the other stations with no central manager or other bottleneck.

As mentioned previously, an MCU controlled video conference may support receiving one video stream with fix resolution or receiving multiple video streams with different resolutions. MCU 116 may support, in addition to regular video conferences, multi-party conferences that escalate from a peer-to-peer chat through a mesh network.

Participants in the video conference such as the end devices and the MCU may communicate also through Session Description Protocol (SDP), which is a format for describing streaming media initialization parameters. SDP is intended for describing multimedia sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats enabling systems based on this technology to be forward compatible.

According to some embodiments, Centralized Conferencing Control Protocol (CCCP) may be employed to facilitate video conferences between the participants. CCCP uses a client-server model for creation, querying, and manipulation of conference system entities, conference objects, and sub-objects. By implementing a CCCP server, a means is provided for authorized CCCP clients (e.g. conference participants) to affect the behavior of a conference. CCCP is a semantic oriented protocol, which uses XML types defined in the conference data package for the representation of conference object and its sub-objects. Thus, the CCCP approach defines a set of semantics (e.g. add, get, set, delete, remove) that operate directly on the conference state elements.

To provide each participant with the ability to request multiple video sources and deliver the right streams, various factors have to be considered including: receiver's capabilities (e.g. PC or mobile device's processing power, downlink bandwidth to the client during the meeting, maximum display addressability), sender's capabilities (e.g. PC or mobile device's processing power, uplink bandwidth from the client during the meeting, webcam maximum resolution), viewer's preferences (e.g. number of sources to view, display size of each source), and infrastructure administration (e.g. the need to limit the bandwidth consumed by video conferences).

Video capabilities may be defined as resolution, frame rate, bit rate, number of streams, and the like. One example scenario is when multiple people request the same source to send different video resolutions. This becomes challenging especially when the number of requesters is large (e.g. in hundreds), since the requests have to be aggregated into a single request to the sender.

A number and combination of video stream combinations provided to recipients from a source through the MCU according to one embodiment may be determined through discovery of sender and recipient capabilities and recipient preferences. Then, a negotiated set of capabilities may be determined and the stream combinations made available to the recipients. At each participant device, the users may be provided an automatic selection of available views, they may be enabled to manually override the automatic selection(s), and viewing configuration may be enhanced through duplicate detection according to various embodiments. Some of all aspects of the multiple video stream viewing configurations may be performed at the MCU, at the participant devices, or a combination of both.

Figure 2:
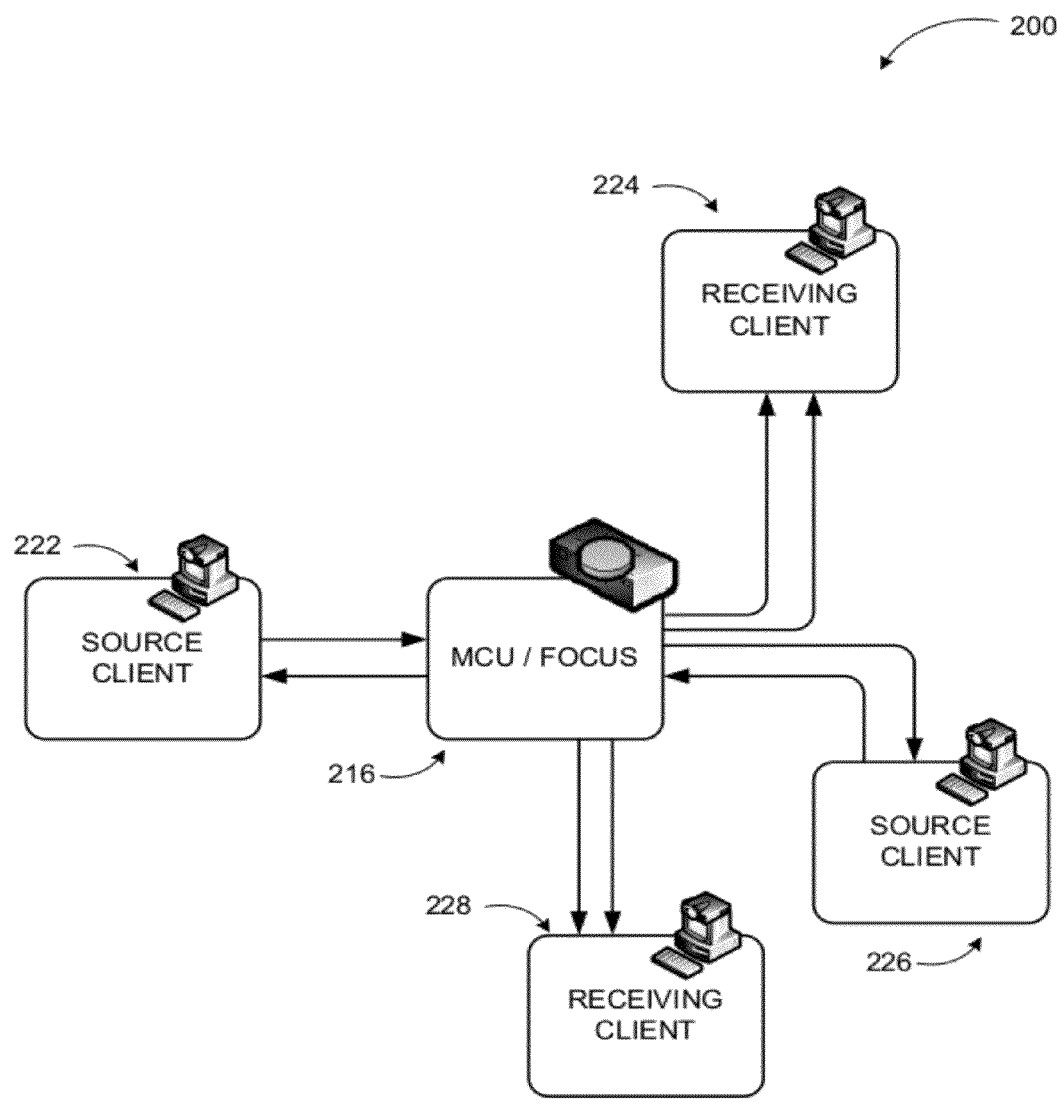
FIG. 2 is a conceptual diagram illustrating an MCU coordinating video conference with a source and multiple receiving participants where multiple video streams may be available to the users.

FIG. 2 is a conceptual diagram illustrating an MCU/focus coordinating video conference with a source and multiple receiving participants where multiple video streams may be available to the users.

Video streams in a conference system according to embodiments may be defined based on their resolution and referred by video stream description. A video stream description describes a video stream by its stream type name, video resolution, maximum frame rate, and maximum allowed bit rate. Examples of resolutions that may be used in a system according to embodiments include, but are not limited to, High Definition (HD), Video Graphics Array (VGA), Common Intermediate Format (CIF), and Quarter CIF (QCIF). For example the video stream description of a stream according to VGA resolution may look like: VGA (640×480, 24, 800000), where the first term is the resolution (x and y axes), the second term is frames per second, and the third term is the bit rate per second.

A video stream combination describes a set of video streams that may be supported at the same time (with an AND relationship) by a video sender or a video receiver. The video stream combination may include a listing of the video stream descriptions of combined resolutions along with a number indicating how many of each resolution the sender or the receiver is capable of supporting.

A video send capability contains a set of video stream combinations that may be supported by the sender. According to one embodiment, these sets of combinations may be supported either or (an OR relationship), but not at same time. Thus, being able to send VGA does not necessarily imply capability to send lower resolution such as CIF or QCIF. Similarly, a video receive capability contains a set of video stream combinations that may be supported by the receiver. These sets of combinations may be supported either or (an OR relationship), but not at same time as in video send capability.

In the system shown in diagram 200, client devices 222 and 226 are in source role (source of video transmission), while all four client devices are also receiving video streams. In a video conference, client devices may become source at any given time based on selection by the MCU/focus 216, selection by a conference administrator, or by dynamic selection (e.g. active speaker determination). The client device in source role may determine its video send capability based on its physical and software attributes such as its processing power, memory size and available memory amount, currently active programs, video applications (each consuming processing and memory capacity), uplink bandwidth, encoding capabilities, and so on. Similarly, each of the receiving client devices may determine their video receive capabilities based on similar factors (except encoding capability).

The conference may be managed by an MCU as described above or by a focus entity. Thus, instead of active speaker switching through media RTP/RTCP channel alone, a signaling channel to the focus may also be employed for controlling video streams. Focus is a conference management entity known in the art. Changes in the conference state also occur as a result of participants' state changes and learned by the focus through the call signaling channel with each of the participants. CCCP requests may be submitted to the focus and can be prioritized and queued, or even interleaved based on a requester's role and the affected XML element(s). CCCP server implemented in the focus, may locally decide on its optimization strategy without relying on any special CCCP clients behavior.

The capability based determinations may be made at the client devices in source role by all receiving clients providing their receive capabilities to the source client through MCU/focus 216 or at the MCU/focus 216 by all clients (source and receiving) providing their capabilities to the MCU/focus 216. In addition to the configuration of video streams and their resolutions based on capabilities, at each receiving client device (application), participants may have the capability to view more than one stream at any given time. However, it is common for video conferences to include more participants than what the receiving devices can display. For example, a video conference may be attended by 100 participants, but the client device/application may be able to display only four video streams at any given time due to bandwidth and local computing resource constraints. Thus, a selection needs to be made regarding which video stream to display. As discussed previously, static selections or purely automatic (e.g. active speaker) selections each have their own shortcomings.

A system according to embodiments enables determination of which video streams to display, whether those video streams are selected automatically or manually, and how to reduce duplication between the displayed video streams. According to one example embodiment, MCU/focus 216 may provide M video streams that show the current active speaker and last M-1 active speakers video streams in time order. As a participant performs manual subscriptions, each subscription may be added up to M-1. Clients may oversubscribe only to a subset of the number of video streams and display in order to handle duplicate removal (e.g. in case there is an overlap in the streams that are showing dynamic speaker switching and the manual speaker). A predictive algorithm may be employed to subscribe or oversubscribe the viewing participant to multiple video streams based on a video screen sizing selected by the same participant.

For example, if there are four active video streams, and six participants in the conference, and a participant selects to pin one other participant to be displayed at all times in his/her view, then that participant is subscribed four and one active video stream is sent to background. This active stream may be brought to a foreground whenever there is a duplication with any of the other three active speaker windows since that window will have the video of a participant who is not currently being displayed.

According to another example embodiment, MCU/focus 216 may provide only one current active speaker video (dominant speaker video) and information on the audio channel (e.g. RTCP) about contributing audio source of the M-1 other active speakers. Clients are enabled to use the information in the audio channel to automatically subscribe to the M-1 currently active speakers based on the information in the audio channel. The current active speaker video allows the conference to have an experience where the current speaker can be shown instantaneously at all times. When the system starts, clients may monitor the active speaker indication to subscribe to the video stream of the M-1 speakers. When a participant pins another participant, one additional subscription is added to take the client subscriptions to M. However, the first video stream is kept in the background and is used for duplicate detection/replacement similar to the above discussed embodiment.

FIG. 4 through FIG. 9 below illustrate example scenarios based on various events in a video conference and how a system may handle multiple dominant speaker video streams with manual override under those conditions.

Figure 3:
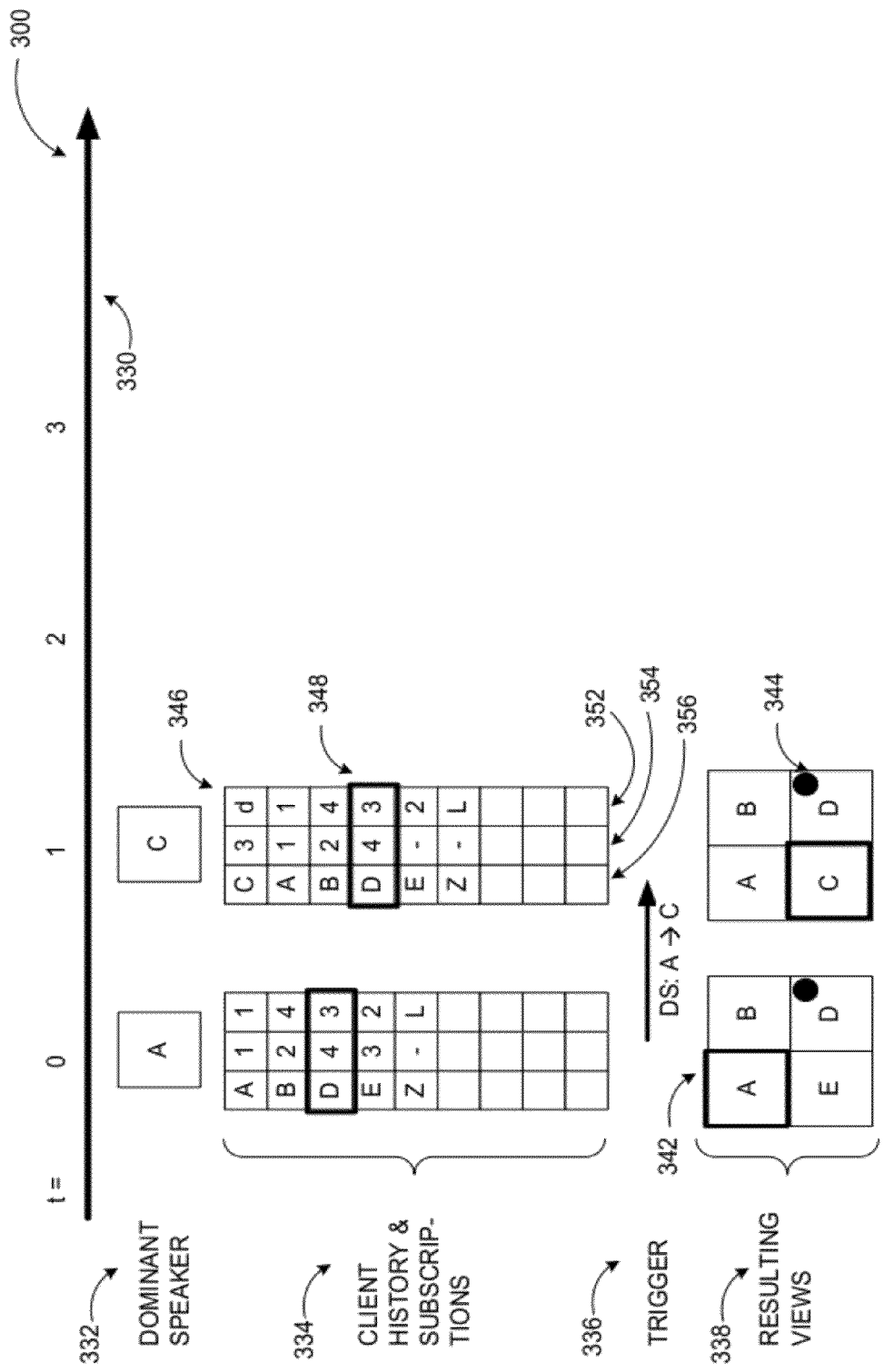
FIG. 3 includes legend explanations for the conceptual diagrams of FIG. 4 through FIG. 9 illustrating multiple video stream selection and configuration in a system according to embodiments.

FIG. 3 includes legend explanations for the conceptual diagrams of FIG. 4 through FIG. 9 illustrating multiple video stream selection and configuration in a system according to embodiments. According to an example scenario, participant Z may multi-select a few people in their buddy list (A, B, C, D, E, etc.) to start a video conference call. During the video conference call, active speaker rotates between the many attendees. Z may pin some attendees occasionally in video panes to continuously see them on the screen. Some times during the video conference, Z may select to see self preview. Some participants may drop out during the video conference as well.

In the diagrams of FIG. 4 through FIG. 9, dominant speakers 332, client history and subscriptions tables 334, trigger events 336, and resulting views 338 are illustrated against timeline 330. Each client history and subscription table includes client history with the most recent dominant speaker being listed at the top. First column 356 lists an identification of the participant in the dominant speaker role. This may be a Uniform Resource Identifier or any other form of identifier employed by the system. Second column 354 lists placement of the video stream associated with the dominant speaker in the first column (same row) on the participant's display. In the example diagrams, "1" means first quadrant pane, "2" second quadrant pane, "3" third quadrant pane, and "4" fourth quadrant pane. Of course, other designations may also be used. Third column 352 lists a identifier of the channel for the video stream (e.g. an RTP stream). An "L" may indicate local self preview, a "d" may indicate dominant speaker, and digits 1-N with N being a maximum number of viewable streams by the participant (e.g. 4) may indicate subscription channels for the participant. Dark rectangle 348 on the client history and subscription tables indicates manual subscription row.

Resulting views 338 displays which video streams are shown in which order with the dark rectangle 342 indicating current dominant speaker and dark dot 344 indicating manual subscription by the participant. The example diagrams show four viewing panes, but embodiments may be implemented with any number of viewing panes as allowed by the client device/application, system capabilities, and so on.

Thus, the example diagram 300 may be interpreted as follows: a video conference for participant Z at time point "t=0" had participant A as dominant speaker displayed on the viewing pane in the first quadrant of the participant's video conference application UI and on subscription channel 1. Other displayed participants at time point "t=0" include previous dominant speaker B in quadrant 2, previous dominant speaker E in quadrant 3, and manually selected participant D in quadrant 4.

Following a change of dominant speaker from A to C, participant C became the dominant speaker at time point "t=1" displayed on the third quadrant of participant Z's video conference application UI. C became the dominant speaker through automatic selection as indicated by the third column in the table 346 for time point "t=1". The rows in the client history and subscriptions table are shifted down by one row. In the resulting view, C replaces E in quadrant 3 with the other three panes remaining the same.

The elements of diagram 300 (and those in FIG. 4 through FIG. 9) are for illustration purposes only. Records and indications of how multiple video streams are selected for viewing may be rendered, stored, and configured in other ways as well. According to one example embodiment, client history and subscription tables may be maintained by the MCU or by individual clients. The system may use the records to present an overview of conference to an administrator.

FIG. 4 through FIG. 9 illustrate how video streams may be selected and configured for display on a user's monitor in a video conference system according to embodiments under various scenarios.

Figure 4:
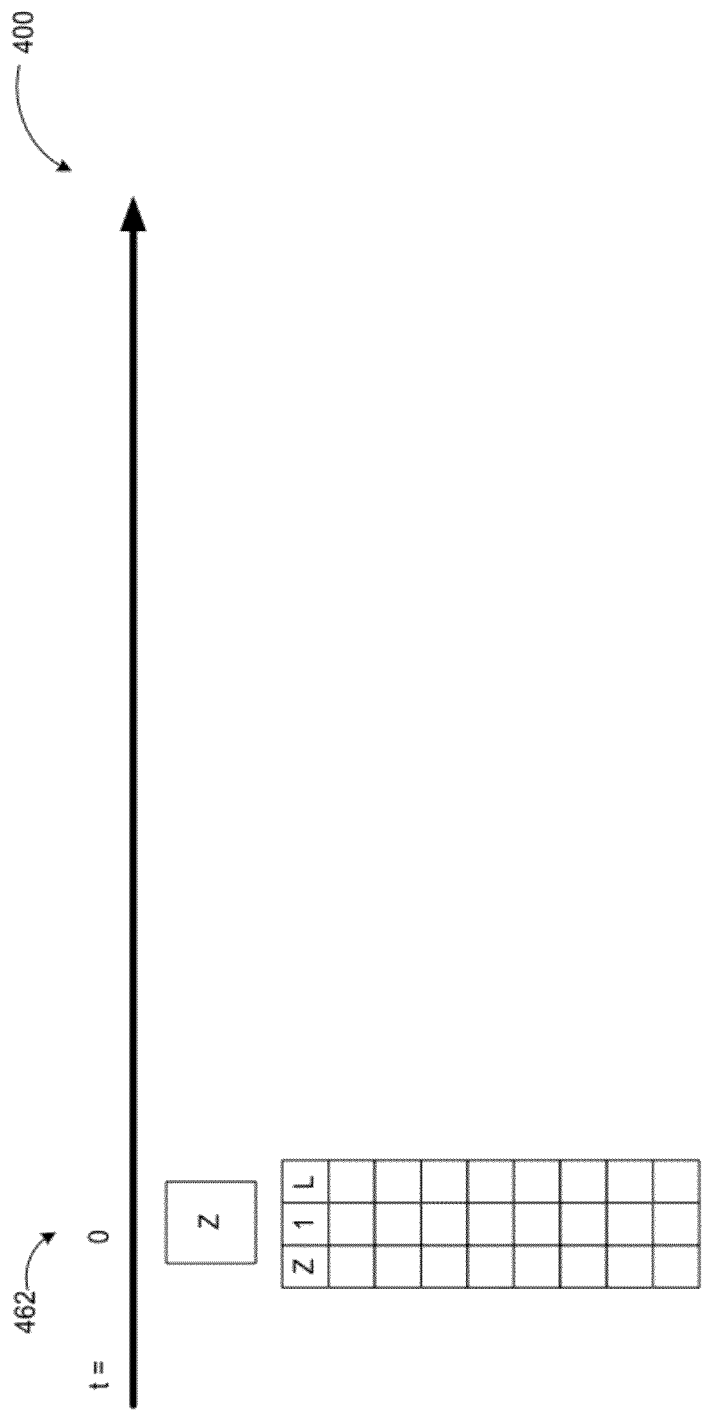
FIG. 4 through FIG. 9 illustrate how video streams may be selected and configured for display on a user's monitor in a video conference system according to embodiments under various scenarios.

Diagram 400 of FIG. 4 illustrates the beginning of a video conference, where participant Z has joined the conference initially (no other participants/video streams) at time point "t=0" 462. Thus Z is the dominant speaker through local preview. Since there is a single video stream to be displayed, the participant's monitor may display the video stream in large format as a single pane (instead of four smaller panes).

According to some embodiments, local preview may also be presented as an additional fifth view pane (463) depending on client capabilities. This may be a hover-type pane that can be moved around the user interface over the other view panes.

Figure 5:
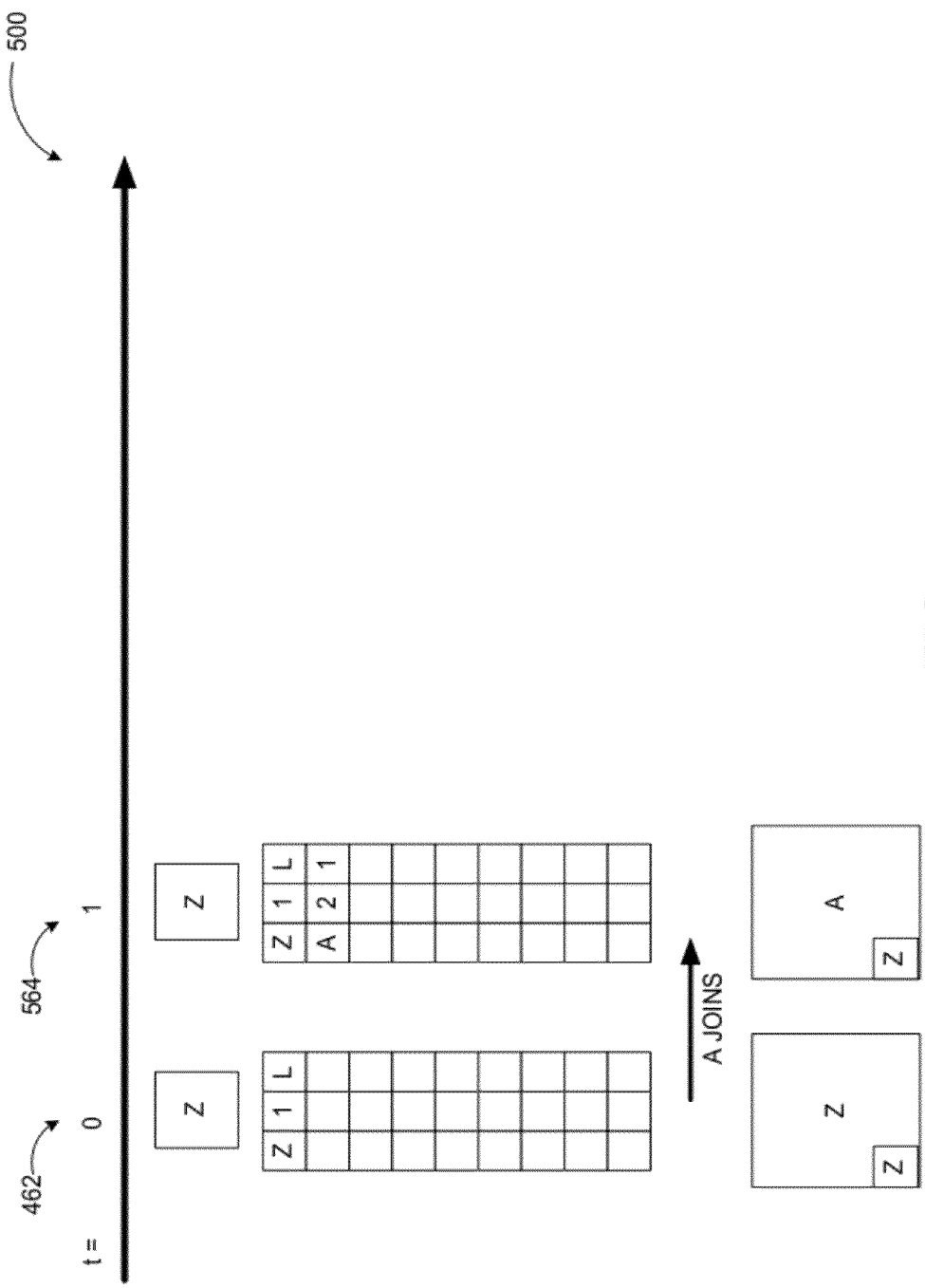

In diagram 500 of FIG. 5, participant A joins the conference as indicated by the trigger event at time point "t=1" (564). A has not been selected as dominant speaker by the system through an automated approach such as active speaker yet. But, Z has manually subscribed to A, therefore A is shown on the main view pane. Because Z is already shown on the local preview pane, the panes are not split. A is displayed in large format.

Figure 6:
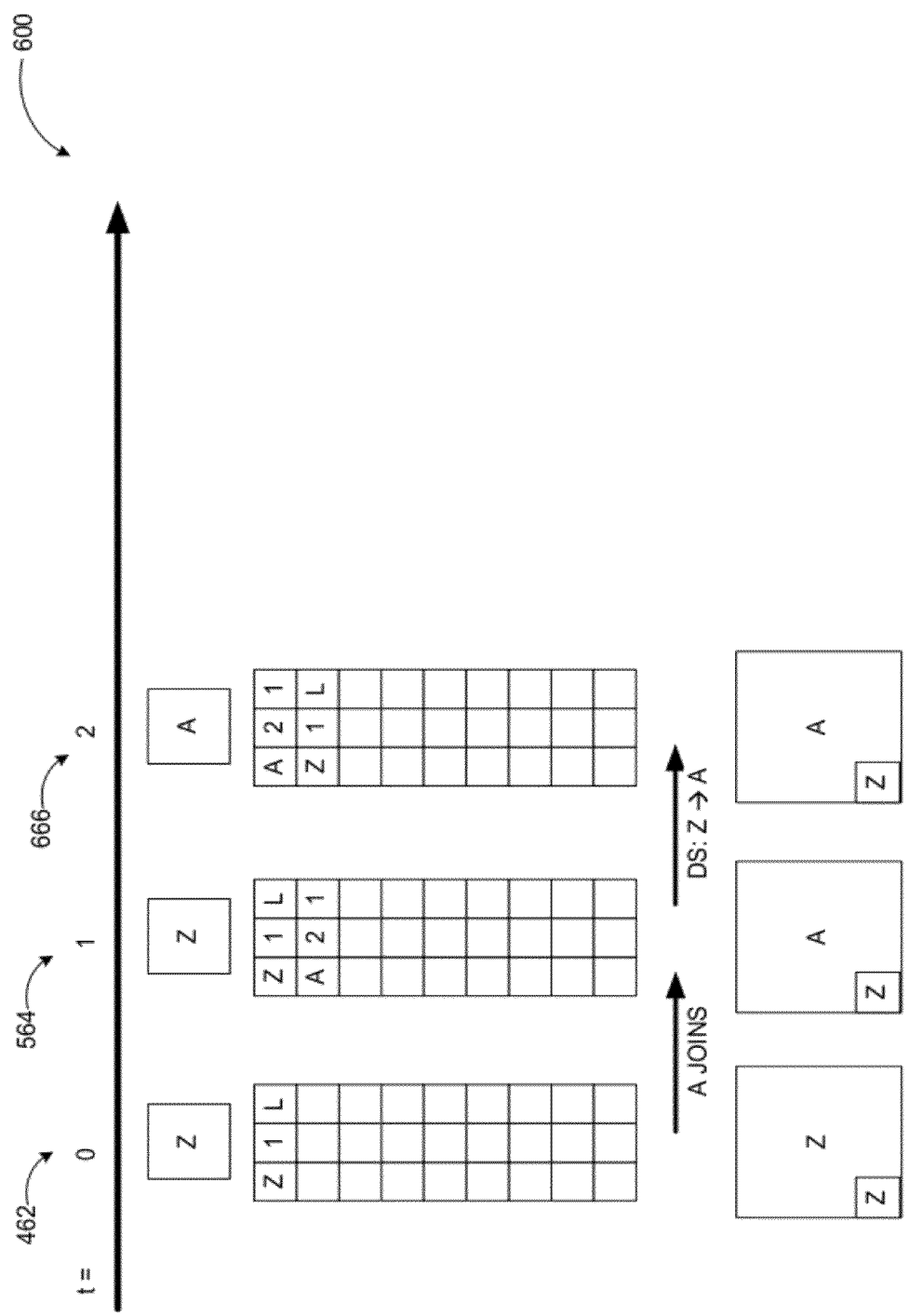

In diagram 600 of FIG. 6, A is selected as dominant speaker (e.g. by active speaker selection) at time point "t=2" (666) and the client history and subscriptions table is updated. A is shown as the dominant speaker, but the resulting views do not change since no one else is present and Z is still using local self preview.

Figure 7:
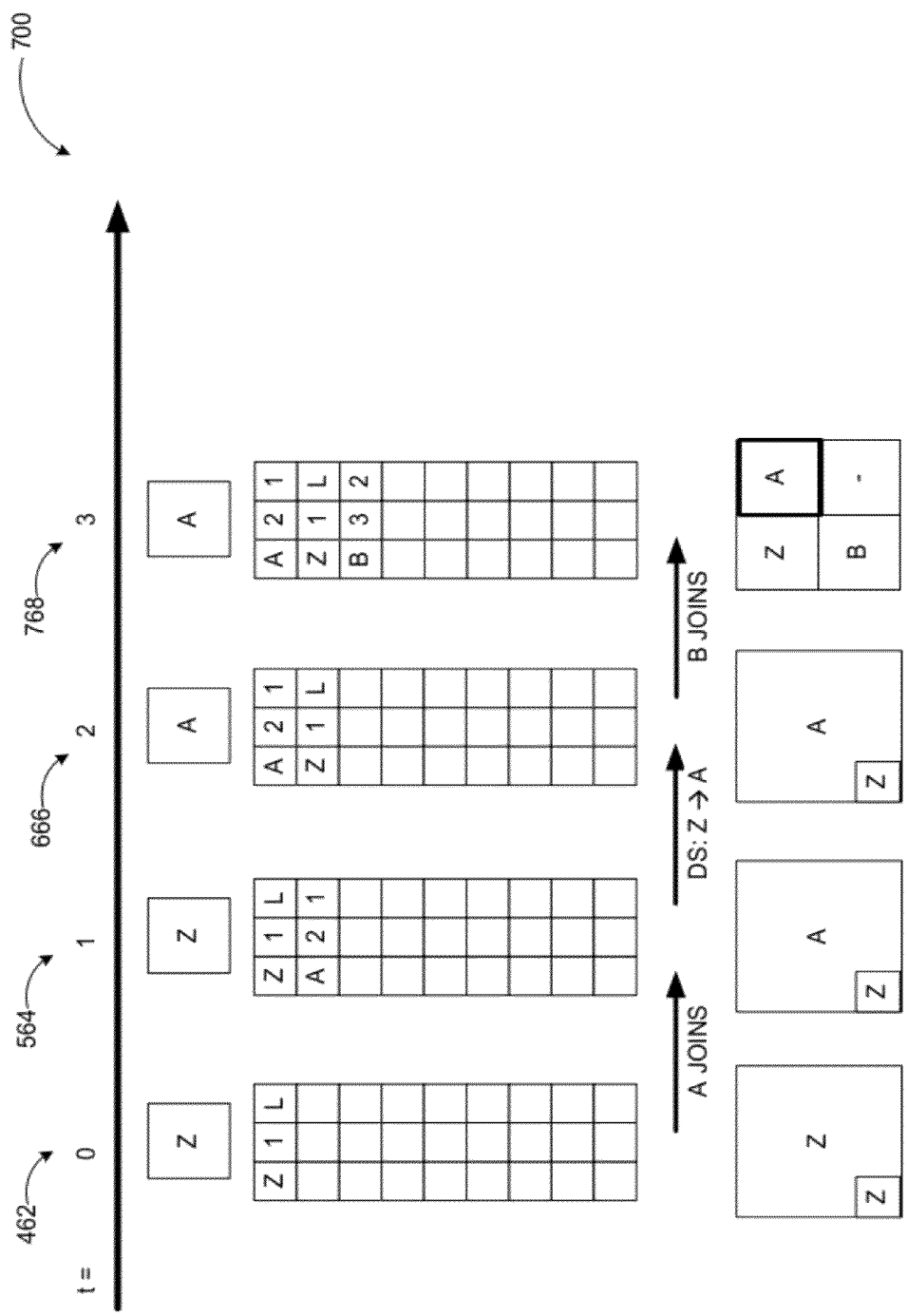

In diagram 700 of FIG. 7, participant B joins the video conference at time point "t=3" (768), but has not been automatically selected dominant speaker yet. Thus, B's records (view pane position, subscription channel, and identifier are added to the table. Since there are three video streams to be viewed now, the UI changes to split pane view with A, the dominant speaker, being displayed in pane 2. Z through local preview is displayed on pane 1. B is displayed on pane 3, and pane 4 is blank.

Figure 8:
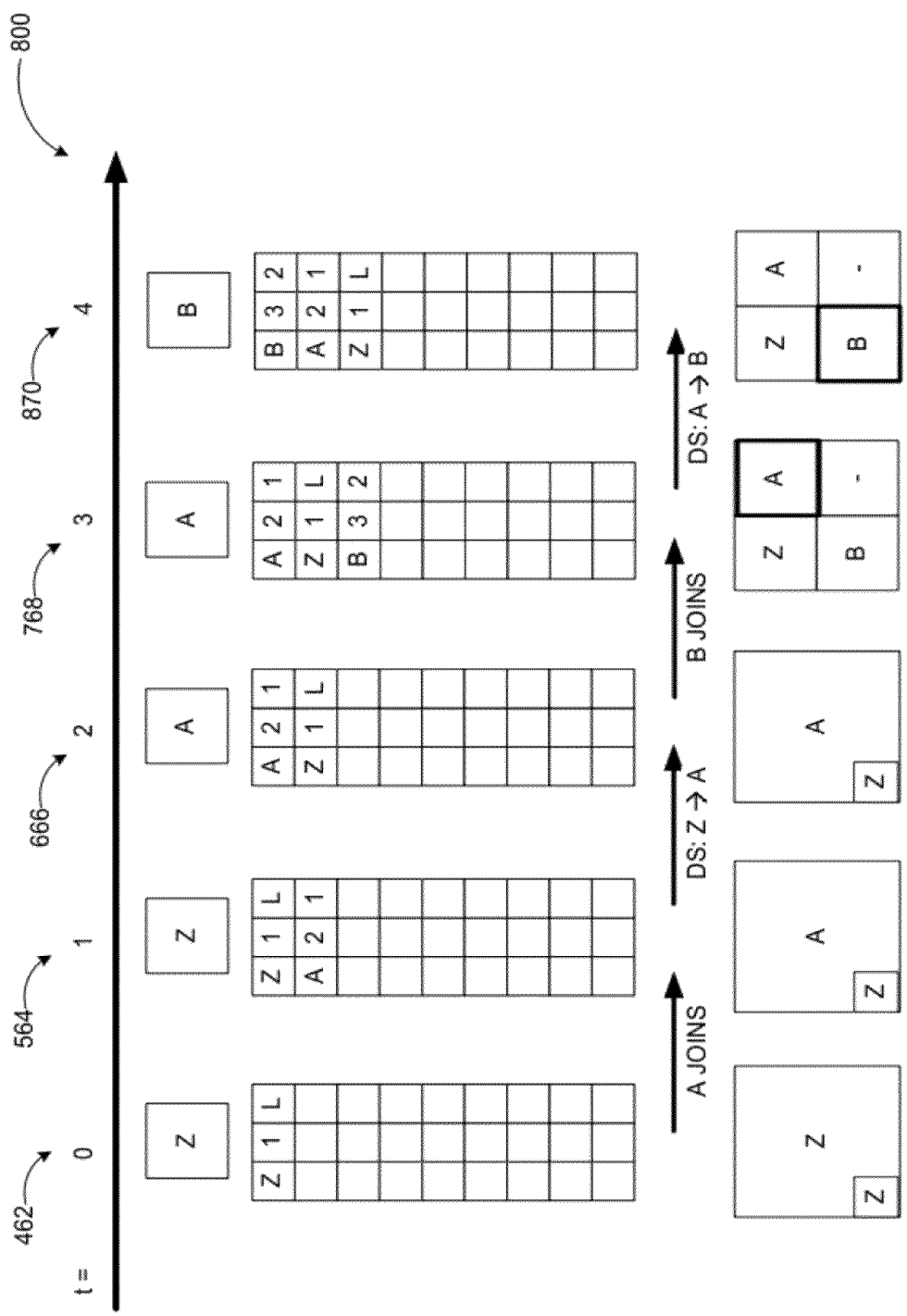

In diagram 800 of FIG. 8, B is selected dominant speaker over A. Similar to the changes in FIG. 6, B is shown as dominant speaker (pane 3). B's records are moved in the client history and subscriptions table. The other participants remain in the same panes, since no other video stream is available.

Figure 9:
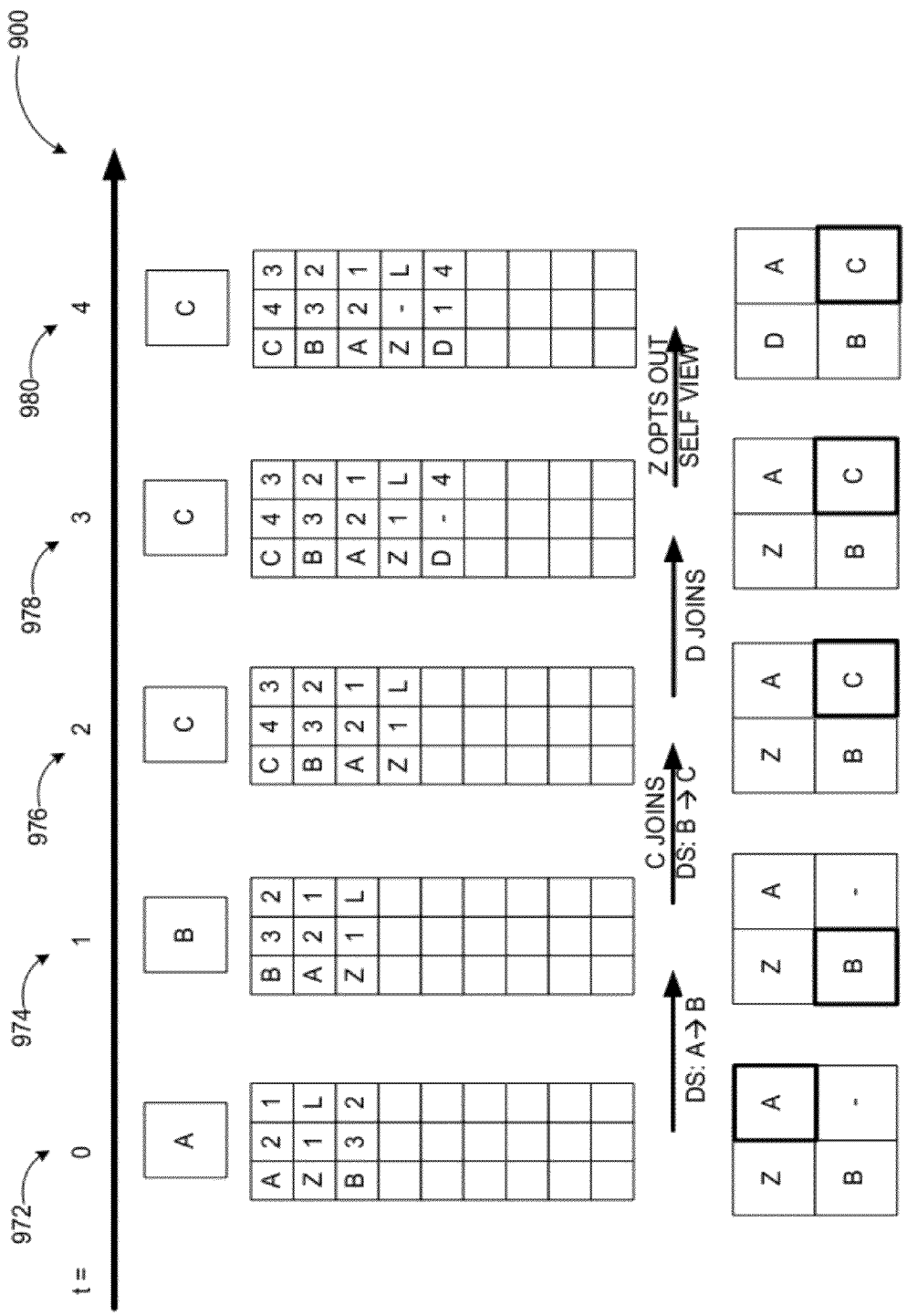

FIG. 9 includes diagram 900 illustrating scenarios where more participants than available view panes may attend the conference. At time point "t=0" (972), Z, A, and B are participating with A being the dominant speaker and Z viewing himself/herself through the local preview channel. At time point "t=1" (974), B becomes dominant speaker over A and the records are updated. At time point "t=2" (976), C joins the conference and is selected dominant speaker (may begin speaking right away). Thus, C is added to the view panes as dominant speaker and the records are updated.

At time point "t=3" (978) of diagram 900, D joins the conference. Although D is on subscription channel 4, A and B are on higher subscription channels and Z is using local preview. Thus, D is not displayed on any of the panes. At time point "t=4" (980), Z turns off local preview. Z is replaced in pane 1 with D. A, B, and C are still displayed on panes 2, 3, and 4 with C still being the dominant speaker.

The above discussed scenarios, example systems, configurations, and selection methods are for illustration purposes. Embodiments are not restricted to those examples. Other selection of video streams, configurations, and scenarios may be used in implementing multiple dominant speaker video streams with manual override in a similar manner using the principles described herein.

Figure 10:
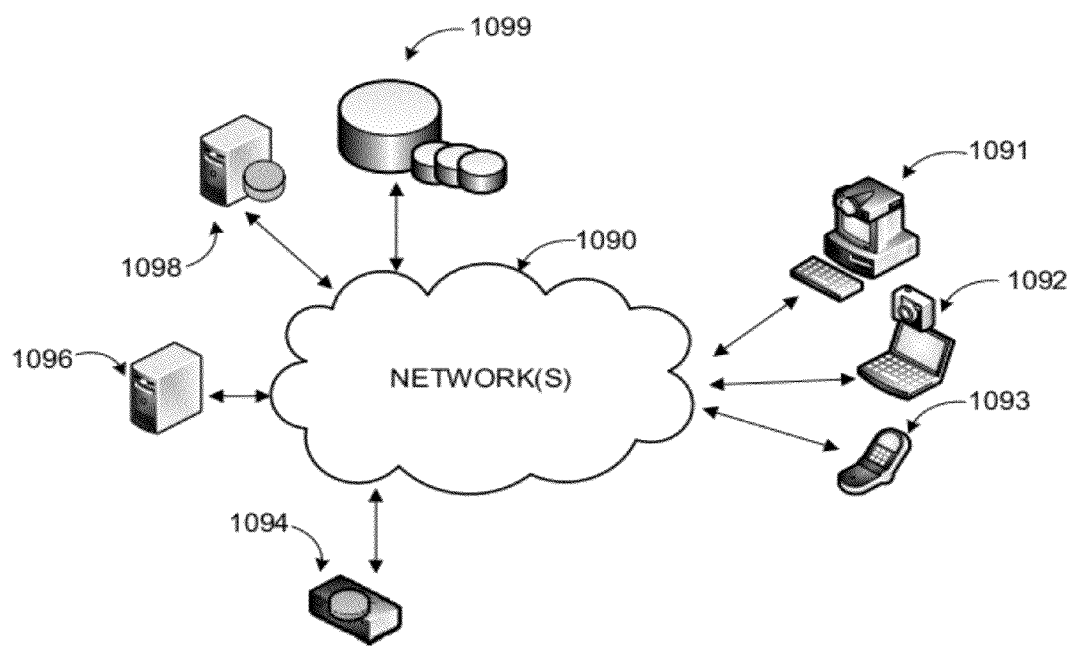
FIG. 10 is a networked environment, where a system according to embodiments may be implemented.

FIG. 10 is an example networked environment, where embodiments may be implemented. Multiple video stream configuration with manual override as described previously may be implemented locally or in a distributed manner over a number of physical and virtual clients and servers. Such a system may typically involve one or more networks such as communication network (s) 1090. The conference may also be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device associated with a participant of the video conference. While a system according to embodiments may involve many more components, typical and relevant ones are discussed in conjunction with this figure.

Video conferences with multiple dominant speaker handling may be facilitated by MCU 1094 alone or in conjunction with a server 1096. Server 1096 may provide complementary services such as storing and processing audio/video data. Data associated with the video conference (e.g. displayed documents, participant addresses, etc.) may be stored in one or more data stores such as data stores 1099, which may be directly accessed by the servers and/or clients of the system or managed through a database server 1098. Communication network(s) 1090 provides the backbone of the video conference system and may employ a number of protocols such as SIP, RTP, SDP, and the like. Client devices (e.g. 1091-1093) provide platforms for participants to transmit and receive audio/video and other signals. Users may access the conference system using a client device or one or more client applications running on a client device.

Communication network(s) 1090 provides communication between the nodes described herein. By way of example, and not limitation, communication network(s) 1090 may include wired media such as a wired network or direct-wired connection, and wireless media such as acoustic, RF, infrared and other wireless media.

Many other configurations of computing devices, applications, data sources, data distribution systems may be employed to implement a video conferencing system with multiple dominant speaker capability. Furthermore, the networked environments discussed in FIG. 10 are for illustration purposes only. Embodiments are not limited to the example applications, modules, or processes.

Figure 11:
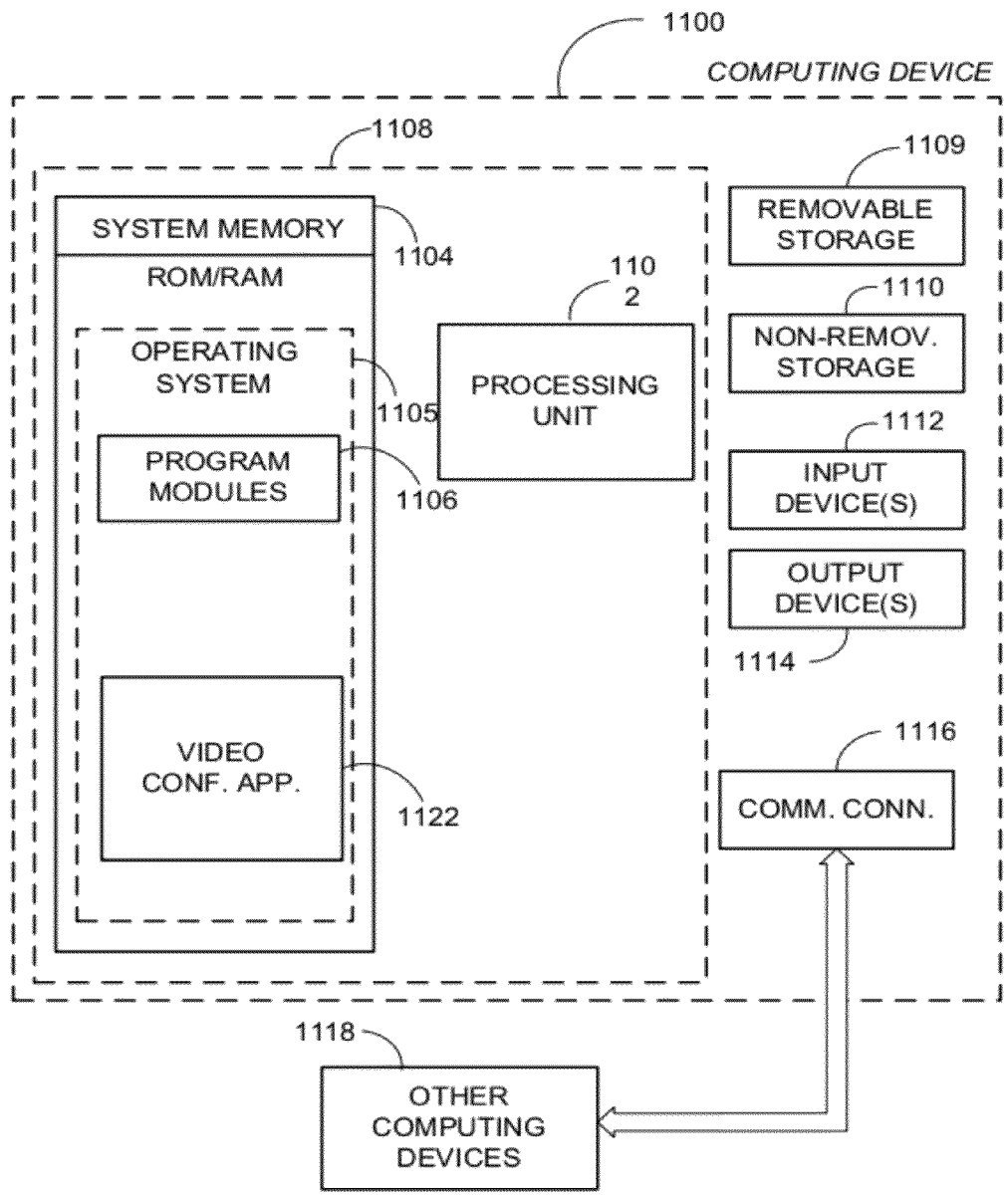
FIG. 11 is a block diagram of an example computing operating environment, where embodiments may be implemented.

FIG. 11 and the associated discussion are intended to provide a brief, general description of a suitable computing environment in which embodiments may be implemented. With reference to FIG. 11, a block diagram of an example computing operating environment for an application according to embodiments is illustrated, such as computing device 1100. In a basic configuration, computing device 1100 may be a server acting as an MCU or a client device for participating in a video conference and include at least one processing unit 1102 and system memory 1104. Computing device 1100 may also include a plurality of processing units that cooperate in executing programs. Depending on the exact configuration and type of computing device, the system memory 1104 may be volatile (such as RAM), non-volatile (such as ROM, flash memory, etc.) or some combination of the two. System memory 1104 typically includes an operating system 1105 suitable for controlling the operation of the platform, such as the WINDOWS® operating systems from MICROSOFT CORPORATION of Redmond, Wash. The system memory 1104 may also include one or more software applications such as program modules 1106, and video conference application 1122.

Video conferencing application 1122 may be a separate application or an integral module of a hosted service application that provides advanced communication services through computing device 1100, as described previously. This basic configuration is illustrated in FIG. 11 by those components within dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer readable storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer readable storage media may be part of computing device 1100. Computing device 1100 may also have input device(s) 1112 such as keyboard, mouse, pen, voice input device, touch input device, and comparable input devices. Output device(s) 1114 such as a display, speakers, printer, and other types of output devices may also be included. These devices are well known in the art and need not be discussed at length here.

Computing device 1100 may also contain communication connections 1116 that allow the device to communicate with other devices 1118, such as over a wireless network in a distributed computing environment, a satellite link, a cellular link, and comparable mechanisms. Other devices 1118 may include computer device(s) that execute video conferencing and/or similar applications. Communication connection(s) 1116 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

A method according embodiments may include receiving a plurality of video streams each video stream being associated with a participant of the video conference, where one of the video streams is designated as current active speaker; receiving a selection of another participant based on an automatic selection algorithm; receiving a selection of a further participant by a viewing participant; and selecting video streams to be displayed to the viewing participant in addition to the video stream of the current active speaker, where video streams associated with the viewing participant selection are prioritized over automatically selected participants, and duplicate video streams are removed from being displayed. The method may further include updating the selected video streams to be displayed in response to designation of a new current active speaker, selection of a new participant by the viewing participant, or automatic selection of a new participant. Information associated with audio sources contributing to the conference may be provided to the viewing participant over an audio channel and the viewing participant enabled to select the other participant based on the information received over the audio channel.

A number of video streams to be displayed to the viewing participant may be determined based on a processing capacity, an available memory size, a number of currently active programs, a number of currently active video applications, a display resolution, a decoding capability, and/or a downlink bandwidth related with the client device associated with the viewing participant according to embodiments. One video stream may be maintained in background for duplicate video stream detection and replacement. At least one of the video streams may be reserved for one of a panoramic view and a room view.

According to other embodiments, duplicate detection may be performed based on comparing participants visible in the reserved video stream and individual participant video streams. One of the video streams may be reserved for a local preview in response to activation of the local preview by the viewing participant. Initial video streams to be displayed to the viewing participant may be determined based on selection of participants received from the viewing participant, status of a local preview feature, and/or a number of initially attending participants. The received video streams may be displayed in split panes and the video stream associated with the current active speaker and the video stream associated with the viewing participant selected participant indicated through a graphical scheme.

According to further embodiments, a table of records associated with the selected video streams may be maintained, where each row of the table represents a video stream with a top row representing a current dominant speaker, a column of the table includes identifiers associated with each video stream, another column of the table includes a view pane assigned to a video stream for display to the viewing participant, and a further column of the table includes a channel selection assigned to the video stream. The rows of the table are shifted down to maintain a history of viewed video streams in response to a new row being inserted to the top of the table representing a new current dominant speaker. The current dominant speaker is either a current active speaker or a viewing participant selected participant. A size of the view pane for displaying a video stream may be adjusted based on a number of available video streams.

Figure 12:
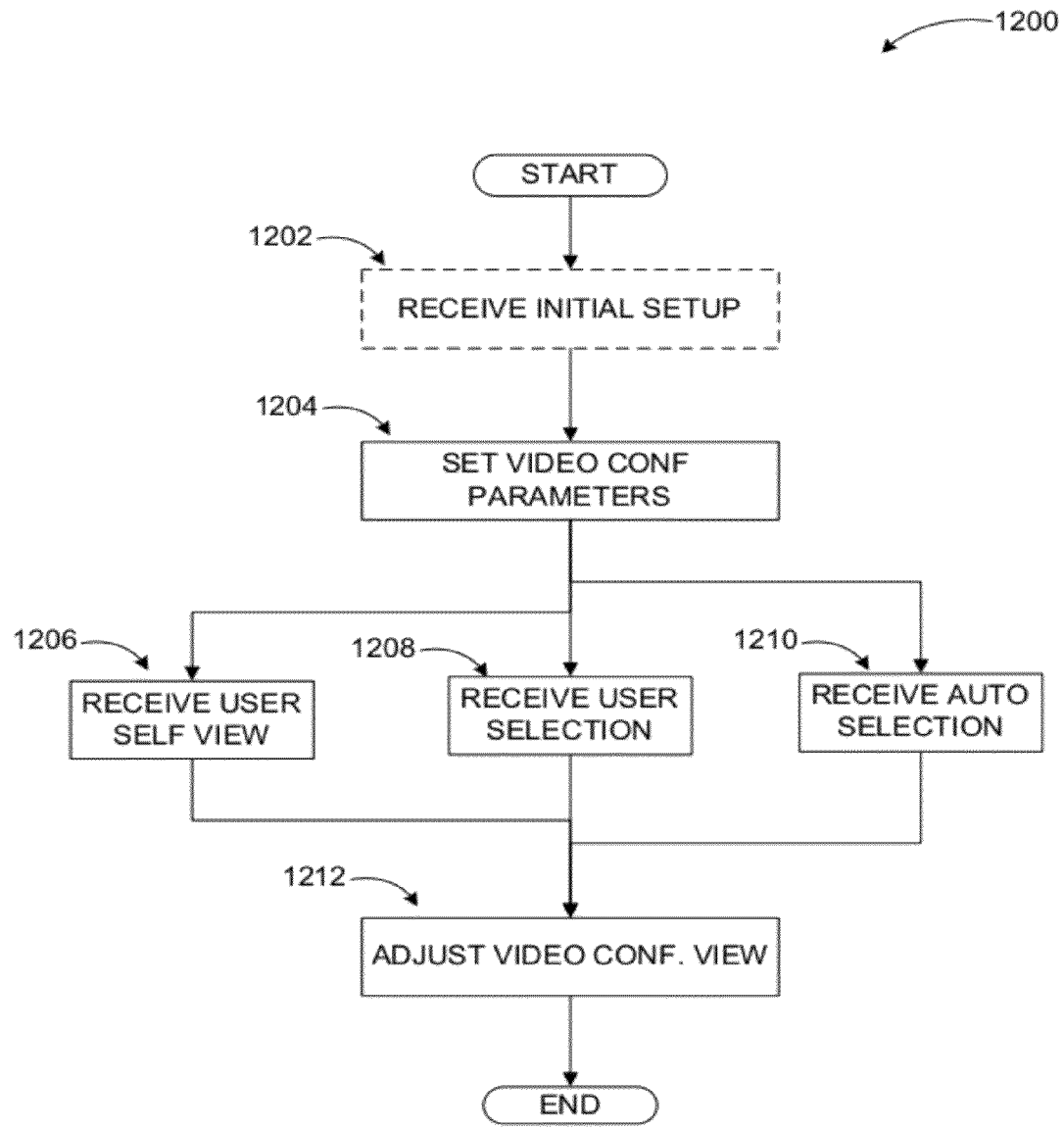
FIG. 12 illustrates a logic flow diagram for a process of facilitating a multi-stream video conference according to embodiments.

FIG. 12 illustrates a logic flow diagram for process 1200 of facilitating a multi-stream video conference according to embodiments. Process 1200 may be implemented as part of a communication system that facilitates video conferences.

Process 1200 begins with optional operation 1202, where initial set up parameters are determined or received. This may include determination of participants in the conference automatically or a selection of participants to be displayed for a particular user (e.g. from a 'buddy list'). At subsequent operation 1204, video conference parameters are set such that when the conference begins, the automatically or manually selected video streams are displayed to the user. For example, the conference may default to the first participant as dominant speaker. In addition, the user may select to view two of his/her colleagues and a self preview. After a duplicate detection check to ensure the default dominant speaker is not a duplicate of one the user's selections, the above listed video streams may be displayed to the user at the beginning of the video conference.

During the video conference, various events may occur. For example, the user may activate or deactivate self preview (1206); the user may make new manual selection for viewing (1208); and automatic selections may be made by the system (1210) based on changes like a new active speaker, a participant leaving or joining the conference, and comparable events.

At operation 1212, the user's displayed video streams are adjusted based on any one of (or combination of) the above listed changes. The monitoring of the changes and configuration of displayed views may be undertaken at the user's client application, at the MCU, or a combination of those two.

The operations included in process 1200 are for illustration purposes. Video conferencing with automatic and manual multiple dominant speaker selection may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating a multiple stream video conference, the method comprising:
    receiving a plurality of video streams each video stream being associated with a participant of the video conference, wherein one of the video streams is designated as current active speaker;
    receiving a selection of at least one other participant based on an automatic selection algorithm;
    receiving a selection of at least one other participant by a viewing participant;
    controlling the video streams through one of: a media channel and a signaling channel with the participants; and
    selecting video streams to be displayed to the viewing participant in addition to the video stream of the current active speaker, wherein video streams associated with the viewing participant selection are prioritized over automatically selected participants, and wherein duplicate video streams are removed from being displayed.

2. The method of claim 1, further comprising:
    updating the selected video streams to be displayed in response to one of: designation of a new current active speaker, selection of a new participant by the viewing participant, and automatic selection of a new participant.

3. The method of claim 1, further comprising:
    providing information associated with audio sources contributing to the conference to the viewing participant over an audio channel.

4. The method of claim 3, wherein the viewing participant is enabled to select the at least one other participant based on the information received over the audio channel.

5. The method of claim 1, wherein the selection of the video streams to be displayed is performed by one of a Multipoint Control Unit (MCU) of a conference system facilitating the video conference and a client device associated with the viewing participant.

6. The method of claim 5, wherein a number of video streams to be displayed to the viewing participant is determined based on at least one from a set of: a processing capacity, an available memory size, a number of currently active programs, a number of currently active video applications, a display resolution, a decoding capability, and a downlink bandwidth related with the client device associated with the viewing participant.

7. The method of claim 1, further comprising:
    predictively oversubscribing the viewing participant to multiple video streams to process duplicate detection in real time.

8. The method of claim 1, wherein at least one of the video streams is reserved for one of a panoramic view and a room view.

9. The method of claim 8, further comprising:
    performing duplicate detection based on comparing participants visible in the reserved video stream and individual participant video streams.

10. The method of claim 1, wherein one of the video streams is reserved for a local preview in response to activation of the local preview by the viewing participant.

11. The method of claim 1, further comprising:
    selecting initial video streams to be displayed to the viewing participant based on at least one from a set of: selection of participants received from the viewing participant, status of a local preview feature, and a number of initially attending participants.

12. A video conference system for facilitating a multiple stream video conference, the system comprising:
   a Multipoint Control Unit (MCU) configured to:
      receive a plurality of video streams associated with participants of the video conference;
      designate one of the video streams is as current active speaker;
      select another video stream associated with another participant based on at least one of a video attribute and an audio attribute of the other participant;
      provide the video stream designated as current active speaker and the other video stream to a client application associated with a viewing participant; and
   a computing device executing the client application, the client application configured to:
      receive a selection of a further participant from the viewing participant;
      select video streams to be displayed to the viewing participant in addition to the video stream of the current active speaker, based on prioritizing a video stream associated with the further participant over the other video stream, and wherein duplicate video streams are removed from being displayed; and
      bring one of the video streams in a background of the client application to a foreground of the client application subsequent to detecting the background video stream as a duplicate of one of the video streams in the foreground.

13. The system of claim 12, wherein the client application is further configured to:
   enable the viewing participant select the video stream associated with the further participant based on information associated with audio sources of the video conference received through an audio channel from the MCU.

14. The system of claim 12, wherein the client application is further configured to:
   display the received video streams in split panes; and
   indicate the video stream associated with the current active speaker and the video stream associated with the viewing participant selected participant through a graphical scheme.

15. The system of claim 12, wherein the MCU is one of: a standalone hardware device, a software program executed by a server facilitating the video conference, a combination of a standalone hardware device and a software program, and a decentralized MCU comprising of coordinated devices of the system.

16. A computer-readable storage medium with instructions stored thereon for facilitating a multiple stream video conference, the instructions comprising:
   receiving a plurality of video streams associated with participants of the video conference;
   controlling the video streams through one of: a media channel and a signaling channel with the participants;
   designating one of the video streams is as current active speaker;
   automatically selecting another video stream associated with another participant based on at least one of a video attribute and an audio attribute of the other participant;
   receiving a selection of a further video stream associated with a further participant from a viewing participant;
   removing duplicate video streams by:
      bringing one of the video streams in a background of the client application to a foreground of the client application subsequent to detecting the background video stream as a duplicate of one of the video streams in the foreground;
   selecting video streams to be displayed to the viewing participant in addition to the video stream of the current active speaker;
   adding a local preview video stream associated with the viewing participant if the local preview is activated by the viewing participant; and
   providing the video stream designated as current active speaker and the selected video streams to a client application associated with the viewing participant.

17. The computer-readable storage medium of claim 16, the instructions further comprising:
   maintaining a table of records associated with the selected video streams, wherein:
      each row of the table represents a video stream with a top row representing a current dominant speaker;
      a column of the table includes identifiers associated with each video stream;
      another column of the table includes a view pane assigned to a video stream for display to the viewing participant; and
      a further column of the table includes a channel selection assigned to the video stream.

18. The computer-readable storage medium of claim 17, wherein rows of the table are shifted down to maintain a history of viewed video streams in response to a new row being inserted to the top of the table representing a new current dominant speaker.

19. The computer-readable storage medium of claim 16, wherein the current dominant speaker is one of: a current active speaker and a viewing participant selected participant.

20. The computer-readable storage medium of claim 16, wherein the instructions further comprise:
   one of predictively subscribing and oversubscribing to multiple video streams based on a video screen sizing selected by the viewing participant.

* * * * *